United States Patent
Meixner et al.

(10) Patent No.: US 10,232,499 B2
(45) Date of Patent: Mar. 19, 2019

(54) PRODUCTION METHOD FOR A TOOL SOCKET

(71) Applicant: Hilti Aktiengesellschaft, Schaan (LI)

(72) Inventors: Ralf Meixner, Germaringen (DE);
Manfred Schallert, Nenzing (AT);
Michael Bischof, Bregenz (CH); Jens Kondratiuk, Buchs/SG (CH)

(73) Assignee: Hilti Aktiengesellschaft, Schaan (LI)

( * ) Notice: Subject to any disclaimer, the term of this patent is extended or adjusted under 35 U.S.C. 154(b) by 331 days.

(21) Appl. No.: 15/102,675

(22) PCT Filed: Dec. 9, 2014

(86) PCT No.: PCT/EP2014/076969
§ 371 (c)(1),
(2) Date: Jun. 8, 2016

(87) PCT Pub. No.: WO2015/086556
PCT Pub. Date: Jun. 18, 2015

(65) Prior Publication Data
US 2016/0303727 A1 Oct. 20, 2016

(30) Foreign Application Priority Data
Dec. 13, 2013 (EP) ..................................... 13197273

(51) Int. Cl.
*B25D 17/08* (2006.01)
*B23K 1/00* (2006.01)
(Continued)

(52) U.S. Cl.
CPC ........... *B25D 17/088* (2013.01); *B22D 25/02* (2013.01); *B23K 1/0008* (2013.01); *C21D 1/60* (2013.01);
(Continued)

(58) Field of Classification Search
CPC .... B22D 25/02; B23K 1/0008; B25D 17/088; B25D 2250/071; B25D 2250/075;
(Continued)

(56) References Cited

U.S. PATENT DOCUMENTS

| 5,016,892 A | 5/1991 | Laffrorgue et al. |
| 7,338,051 B2 | 3/2008 | Buchholz |

(Continued)

FOREIGN PATENT DOCUMENTS

| CN | 101274426 A | 10/2008 |
| CN | 101839621 A | 9/2010 |

(Continued)

*Primary Examiner* — Jenny R Wu
(74) *Attorney, Agent, or Firm* — Davidson, Davidson & Kappel, LLC

(57) ABSTRACT

A production method for a tool socket includes forming a hollow spindle An elongated recess is provided in the wall. The spindle includes unalloyed or low-alloyed steel grades. An insert includes a high-alloyed tool steel. The insert has a pedestal that is complementary to the recess and it also has a rib. The insert is placed into the hollow spindle in such a way that the pedestal rests in the recess and the rib projects into the interior of the spindle. The pedestal is soldered into the recess at a temperature that is above the Ac3 temperatures of the steel grades employed. The combined structure is cooled and then undergoes a heat treatment in an atmosphere containing sufficient carbon to carburize the hollow spindle but not sufficient to carburize the insert. The heat treatment of the combined structure is carried out at a temperature between 800° C. and 950° C. The combined structure is cooled down in a salt bath or liquid bath subsequent to the heat treatment.

6 Claims, 2 Drawing Sheets

(51) Int. Cl.
*C21D 1/60* (2006.01)
*B22D 25/02* (2006.01)
*C21D 9/00* (2006.01)

(52) U.S. Cl.
CPC ...... *C21D 9/0068* (2013.01); *B25D 2250/071* (2013.01); *B25D 2250/075* (2013.01); *B25D 2250/231* (2013.01); *B25D 2250/301* (2013.01)

(58) Field of Classification Search
CPC ........ B25D 2250/231; B25D 2250/301; C21D 1/60; C21D 9/0068
See application file for complete search history.

(56) References Cited

U.S. PATENT DOCUMENTS

| | | | |
|---|---|---|---|
| 7,806,199 | B2 | 10/2010 | Pohl et al. |
| 9,737,948 | B2 | 8/2017 | Helmrich et al. |

FOREIGN PATENT DOCUMENTS

| | | |
|---|---|---|
| CN | 101890690 A | 11/2010 |
| CN | 103056492 A | 4/2013 |
| DE | 19958342 | 6/2001 |

PRODUCTION METHOD FOR A TOOL SOCKET

The present invention relates to a production method for a tool socket, especially for a handheld rotating and chiseling power tool.

BACKGROUND

U.S. Pat. No. 7,338,051 describes a tool socket for a combination hammer drill. The tool socket has a tubular main body in whose interior the drill bit is accommodated so that it can be moved along its axis. Locking elements engage in the interior and secure the drill bit against falling out. Moreover, the tool socket has ribs that engage with corresponding grooves of the drill bit in order to transfer a torque from the tool socket to the drill bit. The ribs are made of a sintered hard metal and are inserted into the main body as inserts. The sintered hard metal is very abrasion-resistant. The ribs are secured in overlapping holes drilled in the main body. Adhesives, a press fit, soldering or welding as well as laser welding can all be employed to achieve a durable fixation.

SUMMARY OF THE INVENTION

The rib is subject to very high mechanical loads. Peak loads of the torque occur, among other things, when the drill bit gets caught on a piece of rebar during the drilling procedure. Moreover, the insert and the main body are subject to vibrations caused by the striking mechanism. High requirements are made of the durability of the connection between the rib and the main body. The process of soldering and welding sintered hard metals is laborious, while adhesives and a press fit do not appear to be suitable measures.

The rib should have a high abrasion resistance and nevertheless be easy to process during the production of the tool socket.

The second material is preferably a cold work tool steel or a high-speed tool steel; hot work tool steels prove to be relatively soft after the soldering and heating treatment.

The production method according to the invention for a tool socket comprises the following steps: a hollow spindle (main body) is formed. At least one elongated recess is provided in the wall. The spindle is made of a first material comprising unalloyed or low-alloyed steel grades. An insert is formed from a second material comprising a high-alloyed tool steel. The insert has a pedestal that is complementary to the recess and it also has a rib. The insert is placed into the hollow spindle in such a way that the pedestal rests in the recess and the rib projects into the interior of the spindle. The pedestal is soldered into the recess at a temperature that is above the Ac3 temperatures of the steel grades employed. The combined structure consisting of the hollow spindle and the insert is cooled off. The combined structure undergoes a heat treatment in an atmosphere containing sufficient carbon to carburize the hollow spindle but not sufficient to carburize the insert. The heat treatment of the combined structure is carried out at a temperature between 800° C. and 950° C. The combined structure is cooled down in a salt bath or liquid bath subsequent to the heat treatment.

Surprisingly, this production method yields an abrasion-resistant rib. A tool steel acquires its hardness from a very specific multi-stage hardening process whose temperature profile is indicated by the steel suppliers. The hardening process entails at least heating the steel up to a temperature at which carbides dissolve as well as a tempering procedure repeated three times at a temperature between 500° C. and 600° C. The third tempering procedure is described in the literature as being essential in order to eliminate residual austenite from the second material as well as to remove the vitreous martensite formed during cooling off, thus resulting in the desired strength of the tool steel. The tool steel loses its hardness when it is heated to considerably above 600° C., while soft annealing can be expected at approximately 800° C. According to conventional teaching, the temperature during soldering as well as during the subsequent heat treatment step speaks against the use of tool steel for the rib.

The heat treatment of the combined structure can be followed by tempering at 180° C. to 210° C., which eliminates stresses, especially in the hollow spindle.

The insert is advantageously formed by means of a forging process or an investment cast process.

BRIEF DESCRIPTION OF THE DRAWINGS

The description below explains the invention on the basis of embodiments and figures provided by way of an example. The figures show the following.

Unless otherwise indicated, identical or functionally equivalent elements are designated in the figures by the same reference numerals.

DETAILED DESCRIPTION

Figure 1:
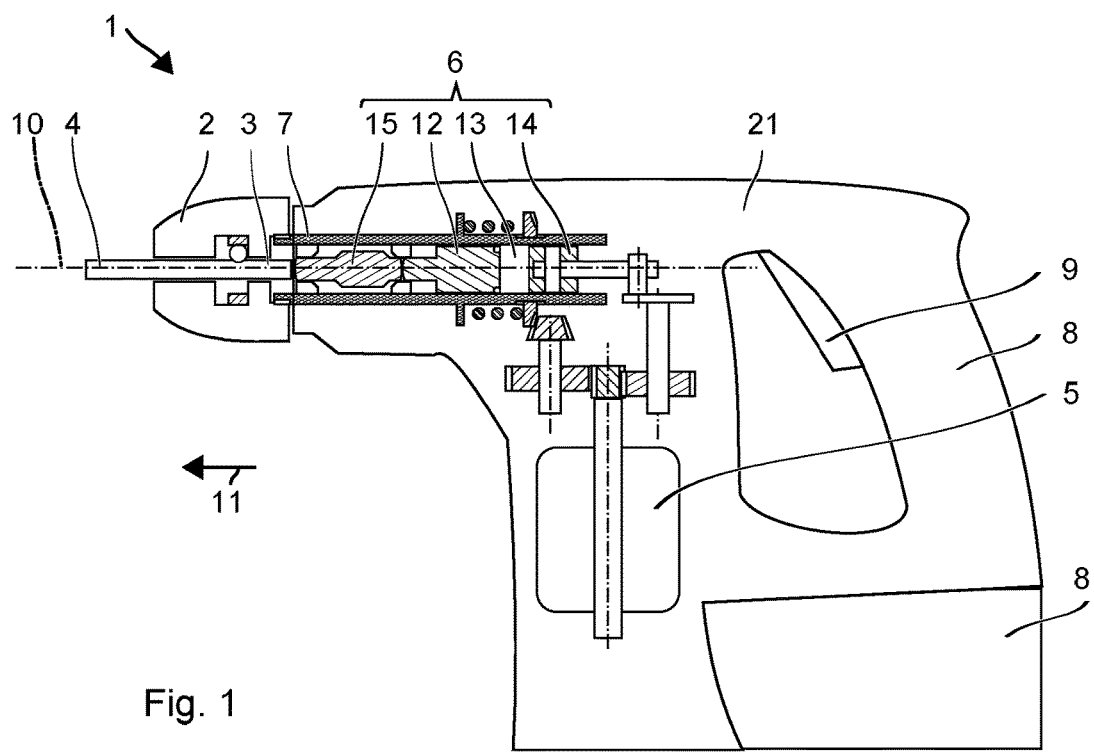
FIG. 1: a combination hammer drill.

FIG. 1 schematically shows a combination hammer drill 1 as an example of a handheld chiseling power tool. The combination hammer drill 1 has a tool socket 2 into which one shank end 3 of a tool, for example, a hammer drill bit 4, can be inserted. The primary drive of the combination hammer drill 1 is in the form of a motor 5 which drives a striking mechanism 6 as well as a driven shaft 7. The user can guide the combination hammer drill 1 by means of a handle 8 and can start up the combination hammer drill 1 by means of a system switch 9. During operation, the combination hammer drill 1 continuously rotates the hammer drill bit 4 around the working axis 10 and, in this process, it can strike the hammer drill bit 4 into a substrate in the striking direction 11 along the working axis 10. The striking mechanism 6 is preferably a motor-driven pneumatic striking mechanism 6. A striker 12 is coupled via an air spring 13 to a piston 14 that is moved back and forth along a working axis 10 by the motor 5. The striker 12 strikes the shank end 3 either directly or else indirectly via a striking pin 15.

Figure 2:
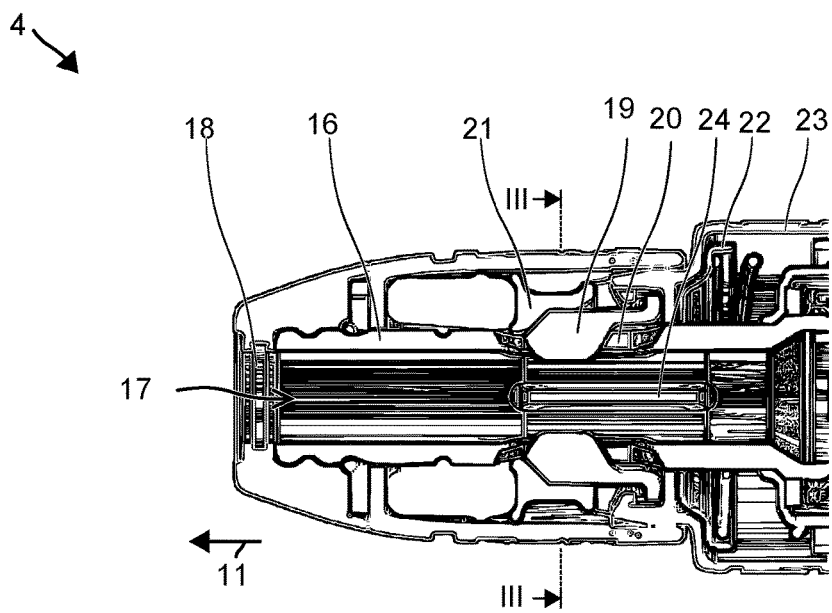
FIG. 2: a tool socket.
Figure 3:
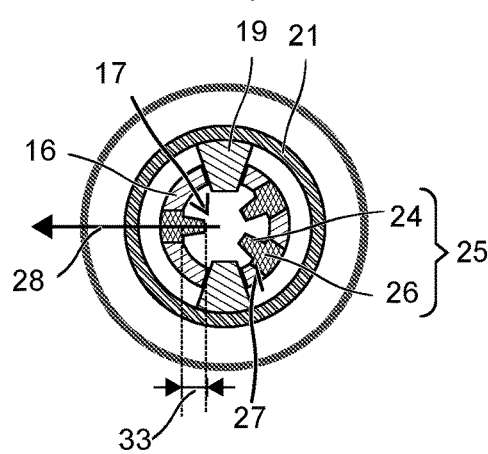
FIG. 3: the tool socket in a cross-sectional view along plane III.
Figure 4:
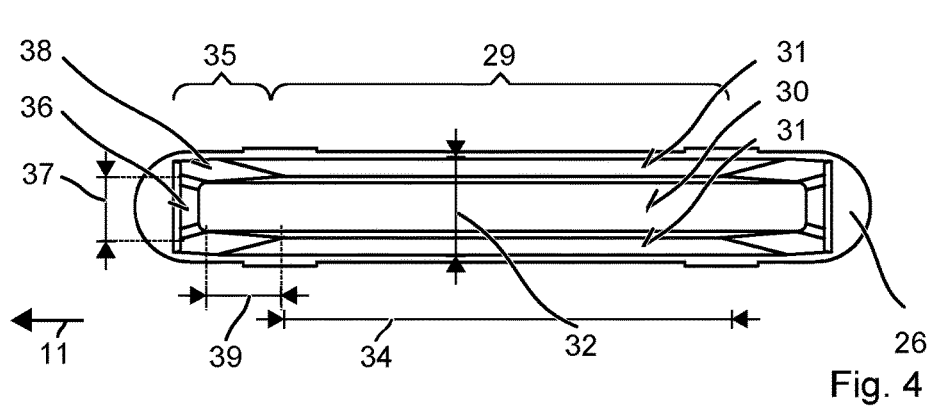
FIG. 4: an insert in a top view.

The tool socket 2 is shown in detail in a longitudinal sectional view in FIG. 2, and in a cross-sectional view in FIG. 3. The tool socket 2 has a hollow spindle 16 (main body) that is driven by the driven shaft 7 and it has a receptacle 17 for the tool 4. The hammer drill bit 4 can be inserted in the insertion direction (counter to the striking direction 11) into the receptacle 17 through an opening 18 located on the driven side. The receptacle 17 is preferably configured so as to be complementary to the shank end 3, for example, cylindrically.

The hammer drill bit 4, which is provided with locking grooves, can be reversibly locked in the receptacle 17 by means of locking elements, here, for instance, pawls 19. The pawls 19 are inserted into elongated holes 20 situated in a wall of the hollow spindle 16. Radial blocking of the pawls 19 is effectuated by a locking ring 21 on which the pawls 19 partially protrude into the receptacle 17 radially from the inside. The part of the pawls 19 that protrudes into the receptacle 17 can engage with the locking groove of the tool 4. A spring-loaded slide 22 holds the pawls 19 inside the locking ring 21, that is to say, so as to overlap axially with the locking ring 21. When the hammer drill bit 4 is inserted, the pawls 19 are moved counter to the spring-loaded slide 22 and they are disengaged from the locking ring 21. The pawls 19 can deflect radially and give access to the receptacle 17. The pawls 19 can be moved counter to the spring-loaded slide 22 by an actuating sleeve 23, as a result of which the radial blocking of the pawls 19 is eliminated and the hammer drill bit 4 can be removed.

The rotational movement of the hollow spindle 16 is transferred to the hammer drill bit 4 via ribs 24 that protrude into the receptacle 17. The tool socket 2 configuration given by way of an example has a rib 24. Alternative tool sockets 4, especially for hammer drill bits having a large diameter, can have two or more ribs 24. Along the working axis 10, the rib 24 is at the height of the elongated holes 20 for the pawls 19.

The rib 24 is the part of an insert 25 that extends beyond the receptacle 17. The insert 25 has the rib 24 and a pedestal 26. For each rib 24, the hollow spindle 16 has a recess 27 into which the pedestal 26 is inserted in the radial direction 28. The recess 27 is complementary to the pedestal 26. The pedestal 26 is permanently affixed in the recess 27 by soldering. The entire insert 25 is preferably monolithic, that is to say, made contiguously of one material, without joining zones. The insert 25 can be made of a tool steel. The hollow spindle 16 is made of a different material, for instance, of an unalloyed or low-alloyed steel.

The rib 24 has a main section 29. The main section 29 transmits essentially the entire torque to the combination hammer drill 1. The exposed outer surfaces—especially a top surface 30 and two side surfaces 31—of the main section 29 are parallel to the working axis 10. The outer surfaces delimit a trapezoidal cross section that is constant along the working axis 10 over the entire length of the main section 29. The top surface 30 is situated perpendicular to a radial direction 28 (vertical direction). The side surfaces 31 preferably adjoin the opposite lengthwise edges of the top surface 30. The side surfaces 31 are preferably slanted relative to each other by between 20° and 40°. Therefore, the rib 24 is preferably wider at its bottom surface, that is to say, at the pedestal 26, than at the top surface 30. The center width 32 of the rib 24 is approximately the same as the height 33 of the rib 24, differing, for example, by less than 20%. The length 34 of the main section 29 is at least three times the value of the height 33. The rib 24 has to be sufficiently long to transfer the torque to the drill bit 4.

The rib 24 has a rear section 35 that is arranged behind the main section 29 in the striking direction 11. The rear section 35 has a front face 36 that faces in the striking direction 11. The front face 36 is preferably trapezoidal. The normal of the front face 36 lies in a plane formed by the working axis 10 and the vertical direction 28. The front face 36 given by way of an example is not perpendicular to the working axis 10 but rather, it is slanted by between 70° and 80°. The front face 36 is preferably flat. The front face 36 is somewhat narrower than the main section 29, that is to say, smaller than the trapezoidal cross section. The width 37 of the front face 36 at the pedestal 26 is between 80% and 90% of the width 32 of the cross section at the pedestal 26.

Two opposite inlet surfaces 38 laterally adjoin the front face 36. The inlet surfaces 38 connect the front face 36 to the side surfaces 31. The flat inlet surfaces 38 are somewhat slanted relative to the side surfaces 31, preferably by between 2° and 10°. The inlet surfaces 38 preferably extend from the pedestal 26 all the way to the top surface 30. The length 39 of the inlet surfaces 38 corresponds approximately to the distance of the two inlet surfaces 38, that is to say, the width 37 of the rib 24.

The pedestal 26 is longer and wider than the rib 2. The pedestal 26 is closed off at its lengthwise ends by semi-cylindrical end pieces. The pedestal 26 is essentially cuboidal between the two end pieces. The recess 27 correspondingly has likewise semi-cylindrical ends with a cuboidal intermediate area.

The hollow spindle 16 is made, for instance, out of a tubular blank. The tubular blank can be cold-expanded to give it the desired inner profile. Subsequently, the inner and outer surfaces are machined. Moreover, the elongated holes 29 for the pawls 19 and also the recess 27 for the insert 25 are machined, for instance, with a grinding head. Bearing sections can be trimmed and polished to the target diameter.

The steel of the tubular blank is preferably a low-alloyed steel, for instance, 16MnCr5. The carbon content is less than 0.4% by weight, preferably more than 0.1% by weight. The steel is low-alloyed; the total admixture of alloy elements is less than 5% by weight. Here, chromium can make up the largest amount, for instance, between 1.0% and 2.2% by weight. The steel can also be unalloyed. The carbon content in this case is likewise less than 0.4% by weight.

The insert 25 is preferably made without involving machining work. The insert 25 is forged, for example, from a steel blank. The shaping is done using, for example, a die into which the blank is placed. The die can consist of multiple parts and it has a shape that is complementary to the insert 25, that is to say, the rib 24 with the pedestal 26. The blank is forged at a temperature between 950° C. and 1150° C. In this process, the Ac3 temperature of the steel is exceeded, as a result of which austenite is formed. After the shaping procedure, the insert 25 cools down, preferably in the air, to room temperature. As an alternative, the insert 25 can be produced by means of an investment cast process.

The blank for the insert 25 is a tool steel, for instance, X155CrVMo12-1. The carbon content is more than 0.8% by weight, preferably less than 2.2% by weight. The blank is high-alloyed, the percentage of the totality of alloy elements is more than 7% by weight.

The insert 25 is placed into the recess 27 of the hollow spindle 16. A soldering agent, preferably a solder containing copper, is inserted between the insert 25 and the hollow spindle 16. The insert 25 is soldered to the hollow spindle 16, for example, in a soldering oven, at a temperature within the range from 1030° C. and 1070° C. The soldering operation takes between 20 and 60 minutes. During the soldering, the steels of the hollow spindle 16 and of the insert 25 are heated up to above their re-crystallization temperature. The tool steel loses hardness in this process. After the soldering, the combined structure consisting of the hollow spindle 16 and the insert 25 cools down in air or in some other gas atmosphere.

The combined structure undergoes heat treatment in the immediately following step. The combined structure is heated up to a temperature between 800° C. and 950° C. The temperature can be raised in two or more steps in order to minimize thermomechanical stresses in the combined structure. The combined structure is kept at this temperature for 30 minutes to 2 hours. This temperature is considerably lower than the temperature that is suitable for hardening the tool steel. In the case of the tool steel X155CrVMo12-1 given by way of an example, this temperature is indicated as being 1160° C. to 1190° C. This temperature is likewise atypical for the heat treatments that are repeated three times for tool steel and that are carried out at a temperature between 400° C. and 600° C. in order to yield the typical hardness and strength of a tool steel.

The heat treatment is carried out in an atmosphere containing carbon, for example, in a gas carburizing furnace. The carbon level is raised by admixing, for instance, methanol and propane. Regulation of the carbon level serves to keep the carbon level preferably constant during the heat treatment. The carbon level is selected in such a way that the hollow spindle 16 is carburized. The carbon level for the selected steel can be obtained from tables or simulations, or else it can be ascertained with just a few experiments. The carbon level is measured in a known manner, indirectly on the basis of the partial pressure of oxygen. The carbon level is also set in such a manner that the tool steel of the insert 25 is not carburized. For instance, the carbon level is between 0.7 and 0.75. The carbon in the insert 25 can be reduced or kept at the same level.

The heat treatment is ended by means of rapid quenching, for example, in oil. The combined structure is hardened. Advantageously, the heat treatment is followed by a one-time tempering procedure at a low temperature between 180° C. and 210° C. in order to relieve internal stresses.

In one embodiment, the quenching of the combined structure to room temperature can be followed by cooling to a temperature between −60° C. and −120° C. Low-temperature cooling is conducive to the hardening of the combined structure. The low-temperature cooling is followed by the one-time tempering procedure.

What is claimed is:

1. A production method for a tool socket, comprising:
   forming a hollow spindle having at least one elongated recess in a wall from a first material of an unalloyed or low-alloyed steel grade;
   forming an insert from a second material of a high-alloyed tool steel, the insert having a pedestal complementary to the recess, the insert also having a rib;
   placing the insert into the hollow spindle in such a way that the pedestal rests in the recess and the rib projects into an interior of the spindle;
   soldering the pedestal into the recess at a temperature above the Ac3 temperature of the first material and above the Ac3 temperature of the second material,
   cooling off a combined structure defined by the hollow spindle and the insert;
   heat treating the combined structure in an atmosphere containing sufficient carbon to carburize the hollow spindle but not sufficient to carburize the insert, the heat treatment of the combined structure being carried out at a temperature between 800° C. and 950° C.; and
   quenching the combined structure in a liquid bath subsequent to the heat treatment
   wherein the first material has a metal alloy content of less than 5% by weight and wherein the second material has a metal alloy content of at least 7% by weight.

2. The production method as recited in claim 1 wherein the heat treatment of the combined structure is followed by tempering at 180° C. to 210° C.

3. The production method as recited in claim 1 wherein the insert is formed by a forging process or an investment cast process.

4. The production method as recited in claim 1 wherein the first material has a carbon content of 0.4% by weight at the maximum.

5. The production method as recited claim 1 wherein the second material has a carbon content of at least 0.8% by weight.

6. The production method as recited in claim 1 wherein the second material is a cold work tool steel or a high-speed tool steel.

* * * * *